(12) United States Patent
Malz et al.

(10) Patent No.: US 6,995,230 B2
(45) Date of Patent: Feb. 7, 2006

(54) STABILIZERS, IN PARTICULAR FOR THERMOPLASTIC POLYURETHANES

(75) Inventors: Hauke Malz, Diepholz (DE); Thomas Flug, Wagenfeld (DE); Peter Böhme, Böhla (DE); Markus Kamieth, Dossenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 228 days.

(21) Appl. No.: 10/312,277

(22) PCT Filed: Jul. 4, 2001

(86) PCT No.: PCT/EP01/07636

§ 371 (c)(1),
(2), (4) Date: Dec. 20, 2002

(87) PCT Pub. No.: WO02/02684

PCT Pub. Date: Jan. 10, 2002

(65) Prior Publication Data

US 2003/0191217 A1    Oct. 9, 2003

(30) Foreign Application Priority Data

Jul. 5, 2000   (DE) ................. 100 32 582

(51) Int. Cl.
*C08G 18/08*    (2006.01)
*C07C 69/76*    (2006.01)
*C09K 15/08*    (2006.01)

(52) U.S. Cl. .................. 528/48; 524/245; 524/289; 524/291; 524/333; 524/343; 252/401; 252/402; 252/404; 560/75

(58) Field of Classification Search ............... 524/245, 524/333, 343, 289, 291; 252/401, 402, 404; 528/48; 560/75

See application file for complete search history.

(56) References Cited

U.S. PATENT DOCUMENTS

| 3,944,594 | A | * | 3/1976 | Kleiner et al. ................. 560/75 |
| 4,032,562 | A | | 6/1977 | Dexter et al. |
| 4,228,297 | A | | 10/1980 | Haeberli et al. |
| 6,800,228 | B1 | * | 10/2004 | Semen ........................ 264/109 |

FOREIGN PATENT DOCUMENTS

| DE | A-2364126 | 7/1974 |
| EP | A-332761 | 9/1989 |
| WO | WO-A 94/22945 | 10/1994 |

OTHER PUBLICATIONS

Patent Abstract of JP 08092165, Sep. 1996.

* cited by examiner

*Primary Examiner*—Tae H. Yoon
(74) *Attorney, Agent, or Firm*—Fernando A. Borrego

(57) ABSTRACT

The invention relates to stabilizers containing at least two phenolic groups bonded to one another via a connecting radical (II) which is a polyol with a number-average molecular weight of from 75×F g/mol to 250×F g/mol, preferably from 100×F g/mol to 200×F g/mol, in particular from 100×F g/mol to 150×F g/mol, where the term F is the number of phenolic groups in the molecule.

12 Claims, No Drawings

STABILIZERS, IN PARTICULAR FOR THERMOPLASTIC POLYURETHANES

The invention relates to stabilizers, preferably amorphous or liquid stabilizers containing at least two phenolic groups bonded to one another via a connecting residue (II) which is a polyol and/or amine with a number-average molar mass of from 75×F g/mol to 250×F g/mol, preferably from 100×F g/mol to 200×F g/mol, in particular from 100×F g/mol to 150×F g/mol, where the term F is the number of phenolic groups in the molecule. According to the invention, one way of calculating the molar mass range of the invention is to multiply the number of phenolic groups by 75 and by 250. If the number of phenolic groups is (F=2); this gives a molar mass range of from 150 to 500 g/mol. The invention further relates to plastics, in particular thermoplastics, in particular thermoplastic polyurethanes, comprising stabilizers of this type, to processes for preparing thermoplastic polyurethanes, and to the use of the stabilizers.

Plastics, such as thermoplastic polyurethanes, are stabilized using heat stabilizers and UV stabilizers, in order to minimize the fall-off in mechanical properties and the discoloration of the products caused by oxidative degradation. Examples of commonly used antioxidants employed in industry are phenolic stabilizers, which are supplied under a variety of tradenames. These phenolic stabilizers have also been widely described in the literature.

DE-A-21 33 374 describes stabilizers having two phenolic groups bonded to one another via esterification by way of a polyetherol residue. EP-A 332 761, DE-A 23 64 126, U.S. Pat. No. 4,032, 562 and JP 08092165-A give very general descriptions of stabilizers similar to those of DE-A 21 33 374.

Particular disadvantages of these stabilizers available commercially is that they are crystalline solids which are difficult to meter and generally have high melting points, and therefore it is difficult to obtain uniform incorporation during the synthesis or processing, in particular that of a thermoplastic polyurethane. In addition, the commonly used stabilizers have a tendency to migrate out from the product and to form a bleed-out of surface deposit. This leads to uncontrolled loss of stabilizer and to impairment of the appearance of the product.

It is an object of the present invention, therefore, to develop stabilizers whose incorporation into plastics, in particular thermoplastic polyurethanes, can be achieved simply, controllably, uniformly and reproducibly. There should moreover be no substantive migration or bleeding-out at any temperature when the stabilizers are used, in particular in thermoplastic polyurethanes, i.e. there should be a marked reduction in the formation of deposition the surface of the thermoplastic polyurethane. There should also be an ideal balance between the compatibility of the stabilizer, in particular with thermoplastic polyurethanes, and its stabilizing action, in order to achieve particularly effective action in respect of these two properties while at the same time minimizing usage of the material.

We have found that this object is achieved by means of the stabilizers described at the outset.

The preferred molar mass of the stabilizers, at least 600 g/mol, particularly preferably from 600 to 10000 g/mol, considerably improves the migration behavior of the stabilizers, i.e. their fogging behavior and bleed-out behavior.

The stabilizers contain two structural units: firstly at least two phenolic groups as active groups (I), bonded to one another via a residue which acts to give compatibility and amorphic character, also referred to in this specification as polyol and/or amine, for example a polyether, polyester, polycarbonate, polythioether and/or polyether polythioether. In this specification below, "polyol and/or amine", i.e. the connecting residue (II), will also be referred to by the abbreviated term "polyol". The polyether, polyester, polycarbonate, polythioether and/or polyether polythioether is the connecting residue (II). The bonding of the phenolic groups (I) to the connecting residue (II) may be brought about via ester groups, amide groups and/or thioester groups, for example, preferably ester groups and amide groups, in particular ester groups. The residues described here which act to give compatibility and amorphic character have at least one, preferably at least two, functional groups reactive toward carboxy groups, for example hydroxy groups and/or amino groups, preferably hydroxy groups. In relation to the connecting residue (II), therefore, the expression "polyol" includes the corresponding amines, in particular diamines. For example, the stabilizers of the invention may therefore be prepared by well known esterification and/or amidation of active substances which have at least one phenolic group, and also at least one carboxy group, using polyetherols, polycarbonateols, polyesterols, polythioetherols and/or polyether polythioetherols which have at least two free groups reactive towards carboxy groups, for example hydroxy groups and/or amino groups.

Examples of active groups (I) which may be present are the following groups:

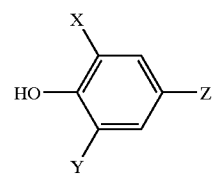

where
X, Y: independently of one another, are hydrogen, straight-chain, branched-chain, or cyclic alkyl groups having from 1 to 12 carbon atoms, and
Z: is at least one carboxy group, e.g. ester group, bonded to the phenol radical via a covalent bond or via an alkylene radical.

It is preferable to use the following compounds for the initial groups:

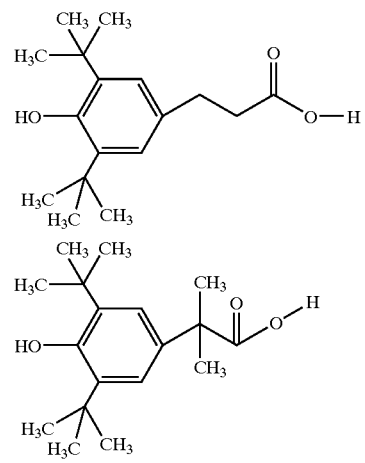

-continued

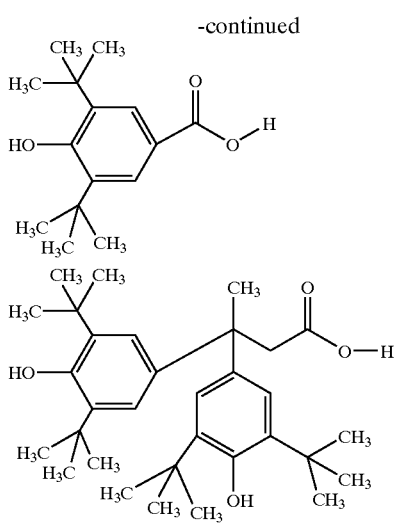

The following compound is particularly preferred as (I):

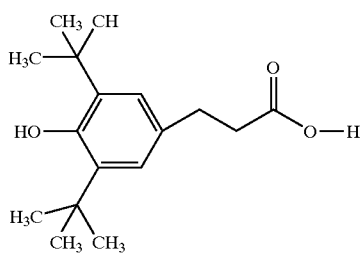

In the formulae shown above, R is preferably H, methyl, ethyl, and/or propyl.

The residue (I) may be used in the form of anhydride, acid chloride, ester, or free acid for bonding to the connecting residue (II). The radical "R" or "Z" in the above formulae varies correspondingly.

According to the invention, these phenolic groups (I) are bonded to one another by a connecting residue (II) by way of the carboxy group of (I). The connecting residue (II) of the invention has a number-average molecular mass of molar mass of from 75×F g/mol to 250×F g/mol, preferably from 100×F g/mol to 200×F g/mol, in particular from 100×F g/mol to 150×F g/mol, where the term F is the number of active phenolic groups (I) in the molecule. This molar mass is based on (II). This molar mass of (II) optimizes the ratio by weight of compatibilizing residue (II) to active group (I). When determining the molar mass of (II) any nitrogen or oxygen present in an amide or ester structure bonding (II) to (I) is to be included.

Preference is also given to polydisperse connecting residues (II), i.e. those whose number-average molar mass is smaller than their weight-average molar mass ($M_n < M_w$). This distribution of molar mass inhibits any undesired crystallization of the stabilizers.

Examples of connecting residues (II) which may be used are widely used polyols, such as polyesterols, polycarbonateols, polyetherols, polythioetherols and/or polyether polythioetherols, preferably polyetherols, polythioetherols and/or polyether polythioetherols, in particular polyetherols, where these have at least two groups reactive toward carboxy groups, for example hydroxy groups, thiol groups, and/or amino groups, such as primary amino groups, which can be reacted with carboxy groups of (I) to prepare the stabilizers of the invention. The connecting residue (II) may have a linear or branched structure.

For example, the stabilizers may have the following structure;

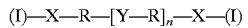

or

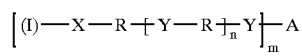

where
(I) represents the active group described at the outset, bonded via its carboxy group,
X: —O—, —S— or —NH—
Y: —O— or —S—,
R: is $C_2$–$C_{12}$-alkylene, the alkylene radical being straight-chain or branched, and
n: is an integer which gives the molar mass of the invention,
m: is 2, 3, 4, 5, 6, 7 or 8,
A: is a hydrocarbon structure containing from 3 to 20 carbon atoms, and where X, Y and R occur more than once in (II), there meanings are independent of one another and may be different on each occasion. For example, x may be both sulfur and oxygen within a connecting residue (II). The definition of n applies to all of the formulae arising in this publication. Preference is given to connecting residues (II) which contain at least two alkylene groups, these differing in their number of carbon atoms.

Residues which may preferably be used as (II) are the following:

(i) 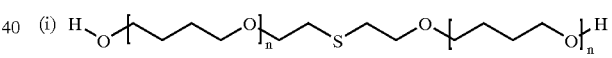

(ii) polytetrahydrofuran having a number-average molar mass of from 200 to 280 g/mol (iii) 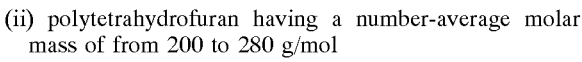

(iv) polyethylene glycol having a number-average molar mass of from 180 to 280 g/mol (v) 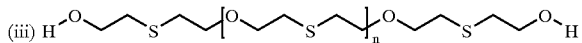

each of n and m is an integer, where n and m may be identical or different, and the total of n and m gives the molecular weight of the invention, and
R is $C_5$–$C_{12}$-alkyl, linear or branched (vi) polyesters of adipic acid, for example with diols which have from 2 to 10 carbon atoms, preferably from 2 to 6 carbon atoms, e.g. butanediol adipates and/or butanediol/ethylene glycol adipates (vii) a trifunctional polyetherol, e.g. Lupraphen® VP 9266 (BASF Aktiengesellschaft)

(viii) 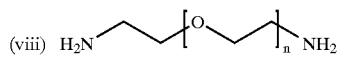

n being selected so that the number-average molar mass of the polyetheramine is from 180 to 280 g/mol.

It can moreover be advantageous to mix different residues (II) and to react the mixture with (I) in order to establish an ideal viscosity, compatibility, solubility and bleed-out behavior for the resultant stabilizer.

Surprisingly, it has been shown that diols of the formula (ix) 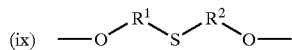

where $R^1=C_xH_{2x}$, where X=1–6

$R^2=C_xH_{2x}$, where X=1–6, and $R^1 \neq R^2$ are likewise amorphous and can therefore give good incorporation into the plastic during synthesis and processing.

If there is more than one sulfur atom in (II) then the connecting residues (II) preferred are those in which sulfur and oxygen occur in alternation with an alkylene radical separating each from the next. This gives an ideal ratio of sulfur, which works as secondary stabilizer, to oxygen, which gives the stabilizer polarity and therefore compatibility.

If the advantage of a liquid stabilizer is that liquid metering is easy in comparison with solids metering. This requires that the finished stabilizer has a particular viscosity. Since the viscosity is a function of temperature (described by an Arrhenius plot and the activation enthalpy $E_0$), there are two further criteria which can be used for selecting the stabilizers, namely the viscosity at a particular temperature and the viscosity at room temperature together with the activation enthalpy.

Residues (II) suitable for giving easy incorporation are those from which the condensation product made from (I) and (II) has a viscosity at room temperature (25° C.) of from $\eta=10^{-2}–10^2$ Pas, preferably from $10^{-1}–10^1$ Pas, or else a viscosity $\eta=10^1–10^4$ Pas at room temperature and an activation enthalpy $E_0$ of from 50 to 200 kJ/mol, preferably $\eta$ from $10^2–10^3$ Pas together with an activation enthalpy $E_0$ of from 70 to 120 kJ/mol, the viscosity at various temperatures being capable of extrapolation using the equation:

$a_T=\eta(T)/\eta(T_o)$ $a_T=\exp(E_o/R*(1(T-1/T_o))$

R= general gas constant $T_0$= viscosity at room temperature

The stabilizers of the invention may be prepared by well known esterification or amidization, or transesterification or transamidation, processes. To accelerate the reaction, use may be made of well known catalysts, e.g. tin compounds, such as dibutyltin dilaurate and/or dimethyltin dilaurate, titanium compounds, such as titanium tetrabutoxide, sulfonic acids, such as toluenesulfonic acid, or basic catalysts, such as lithium hydroxide, lithium methoxide, lithium ethoxide, potassium hydroxide, potassium methoxide, potassium ethoxide, potassium tert-butoxide, sodium hydroxide, sodium methoxide, sodium ethoxide, and/or sodium tert-butoxide, preferably potassium methoxide or potassium tert-butoxide.

It has been found to be advantageous for the catalyst not to be added all at once to the reaction mixture, but to be metered in progressively, since this can shorten the reaction time.

If use is made of metal catalysts, the polyol (II), e.g. a polytetramethylene glycol, and the active group (I), e.g. methyl 3-(3,5-di-tert-butyl-4-hydroxyphenyl)propionate, are placed in a reactor and heated to 100° C. The solution is inertized. From 10 to 1 000 ppm, preferably from 10 to 500 ppm, particularly preferably from 10 to 100 ppm, of the metal catalyst, e.g. dimethyltin dilaurate, are then added to the solution. The reaction temperature is then raised to 120° C.–200° C., preferably 130–170° C., and the resultant methanol is removed by distillation. Once the reaction is complete, the stabilizer of the invention can be used in the form in which it is obtained. However, the stabilizer of the invention may, where appropriate, also be purified with respect to low-molecular-weight constituents by passage through, for example, a thin-film evaporator.

If a polyetherol, for example, such as a polyethylene glycol, is used as connecting residue (II), the basic catalyst which was used to prepare the polyethylene glycol may be used to prepare the stabilizer of the invention, i.e. there is no need to isolate the catalyst after preparation of the polyetherol. In this case, the polyetherol (II) is typically placed in a reactor. The active group (I), e.g. methyl 3-(3,5-di-tert-butyl-4-hydroxy-phenyl)propionate, is then placed in the reactor, and the mixture is heated to 100° C. After inertization is complete, an amount of basic catalyst, e.g. potassium methoxide, is added to the reaction mixture, the amount being sufficient to make the total of the metered-in potassium methoxide and the catalyst remaining in the polyetherol (II) from the synthesis from 500 to 5 000 ppm, preferably from 1 000 to 2 000 ppm, based on the potassium methoxide. The reaction temperature is then raised to 120° C.–200° C., preferably 130–170° C., particularly preferably from 140 to 150° C., and the methanol produced is removed by distillation. Where appropriate, more potassium methoxide may be added subsequently during the reaction to increase conversion.

After completion of the reaction, the potassium catalyst may then be removed from the stabilizer of the invention using well known methods for removing potassium catalysts from polyetherols. An example of a method for this is the use of ion exchangers or the use of phosphoric acid or hydrochloric acid, preferably phosphoric acid.

An example of a method for this is then that 85% of the stoichiometric amount of phosphoric acid (the term stoichiometric here relating to the amount of potassium methoxide used, implying that there can be variation) is metered into the reaction mixture and stirred for 30 min. Following this, by way of example from 1 to 10% by weight of water, preferably from 1 to 5% by weight of water, are added to the reaction solution, which is stirred for a further 30 to 240 min, preferably from 30 to 60 min. The stabilizer of the invention is then dried until water content is <1% by weight, preferably <0.1% by weight, particularly preferably <0.05% by weight, and the precipitated solid is removed. After filtration, the stabilizer may also, where appropriate, be freed from low-molecular-weight constituents by passing through, for example, a thin-film evaporator.

The synthesis of the phenolic active groups (I) is well known, and an example of specifications for the synthesis of methyl 3-(3,5-di-tert-butyl-4-hydroxyphenyl)-propionate is found in U.S. Pat. No. 3,644,482, page 4, line 28.

An example of a method for preparing methyl 3-(3,5-di-tert-butyl-4-hydroxyphenyl)propionate is to place the following in a reactor: 2,6-di-tert-butylphenol and from 0.1 to 10 mol %, based on 2,6-di-tert-butylphenol, of a basic catalyst, e.g. lithium hydroxide, lithuim methoxide, lithium ethoxide, potassium hydroxide, potassium methoxide, potassium ethoxide, potassium tert-butoxide, sodium hydroxide, sodium methoxide, sodium ethoxide, and/or sodium tert-butoxide, preferably potassium methoxide or potassium tert-butoxide. Once the corresponding acid, e.g. methanol if potassium methoxide is used, or water if potassium hydroxide is used, has been removed by heating to, for example, from 120 to 200° C., preferably from 130 to 160° C., using a flushing stream of nitrogen and/or vacuum, the reactive mixture is then brought to 120–160° C., preferably to 130–150° C., and methyl acrylate is slowly metered in. This feed is preferably carried out under a pressure which is greater than the vapor pressure of methyl acrylate at the prevailing reaction temperature. This ensures that methyl acrylate does not escape by evaporation from the reaction solution. The amount of methyl acrylate metered into the 2,6-di-tert-butylphenol, based on 2,6-di-tert-butyl phenol, is preferably from 90 to 120 mol %, based on 2,6-di-tert-butylphenol, in particular from 95 to 110 mol %. The reaction is stopped after from 60 to 180 min. The reaction product may be purified by neutralizing the alkaline catalyst and then recrystallizing or rectifying in a well known manner.

However, if a basic catalyst is to be used in the subsequent preparation of the stabilizer of the invention, a possible method for this is that any excess methyl acrylate present is removed from the reaction product, for example at 60° C. in vacuo and/or with use of a flushing stream of nitrogen, and the polyol (II) is added to the mixture. After inertization, the transesterification reaction is then continued as described above. The advantage of this one-pot procedure is the efficient utilization of the reactor and the omission of the purification step.

The stabilizers of the invention may be used for stabilization, for example with respect to UV radiation, in any known plastic, such as acrylonitrile/butadiene/styrene copolymers (ABS), ASA, SAN, polyacetals, polyethylene oxide, polyesters, such as polyethylene terephthalates, polyethylene, polypropylene, polybutylene, polyisoprene, and also copolymers of poly-α-olefins, and also polystyrene, EPM, EPDM, vinyl resins formed during polymerization of vinyl halides with unsaturated polymerizable compounds, for example with vinyl esters, with α,β-unsaturated aldehydes, or with unsaturated hydrocarbons, such as butadiene or styrene, or in PVC, acrylate rubber, polyoxymethylene (POM), lubricating oils of aliphatic ester type (such as di(2-ethylhexyl) acelate, pentaerythritol tetracaproate), animal and vegetable oils (such as linseed oil, fat, tallow, lard, groundnut oil, cod liver oil, castor oil, palm oil, corn oil, cottonseed oil), hydrocarbon materials (such as gasolene, mineral oil, fuel oil, dry oils, cutting fluids, waxes, resins, and rubber), fatty acids (e.g. soaps), polyamides, such as polyhexamethyleneadipamide and polycaprolactam, polycarbonate, and/or compact or cellular polyurethane, in particular thermoplastic polyurethanes, also termed TPUs in this specification, for stabilization, for example with respect to thermooxidative degradation and UV radiation. The stabilizers are also suitable for stabilizing organic compounds generally, for example organic compounds with a molar mass of from 50 to 100000 g/mol, such as polyesters, polyethers, polyesterols, or polyetherols. The stabilizers are preferably used in thermoplastic polyurethanes.

The amount of the stabilizers preferably present in the plastics, in particular in the TPUs, is from 0.01 to 5% by weight, particularly preferably from 0.1 to 2% by weight, in particular from 0.3 to 1.5% by weight, based in each case on the weight of the thermoplastics.

In addition to the stabilizers of the invention, other well known stabilizers may be used in the thermoplastics, for example phosphites, thiosynergists, HALS compounds, UV absorbers, quenchers, and sterically hindered phenols. Examples of these antioxidants are given in EP-A 698 637, page 6, line 12 to page 9, line 33.

The stabilizers of the invention may be added either to the compounds (b) reactive towards isocyanates prior to or during the preparation of the TPUs or else added to the finished TPU, for example to the melted or softened TPU. The thermoplastic polyurethane can be processed thermoplastically without losing the effect of the stabilizers of the invention.

Processes for preparing TPUs are well known. One way of preparing the thermoplastic polyurethanes is by reacting (a) isocyanates with (b) compounds reactive towards isocyanates and having a molar mass of from 500 to 10 000, and, where appropriate, with (c) chain extenders having a molar mass of from 50 to 499, where appropriate in the presence (d) catalysts, and/or of (e) conventional auxiliaries and/or additives, the reaction being carried out in the presence of the stabilizers of the invention.

Examples of the starting components and processes for preparing the preferred TPUs are given below.

The following are examples of the components (a), (b), and also, where appropriate (c), (e), and/or (f) usually used in preparing the TPU:

a) Organic isocyanates (a) which may be used are well known aliphatic, cycloaliphatic, araliphatic and/or aromatic isocyanates, such as tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), TODI, EDI, 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or bicyclohexylmethane 4,4'-, 2,4'-, and 2,2'-diisocyanate, diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), diphenylmethane diisocyanate, dimethylbiphenyl 3,3'-diisocyanate, diphenylethane 1,2-diisocyanate and/or phenylene diisocyanate.

b) Compounds (b) which are reactive towards isocyanates and which may be used are the well known compounds reactive towards isocyanates, such as polyesterols, polyetherols, and/or polycarbonate diols, these usually being grouped together under the term "polyols", having molar masses of from 500 to 8000, preferably from 600 to 6000, in particular from 800 to 4000, and preferably having a functionality of from 1.8 to 2.3, with preference from 1.9 to 2.2, in particular 2. It is preferable to use polyether polyols, such as those based on well known starter substances and on conventional alkylene oxides, such as ethylene oxide, propylene oxide, and/or butylene oxide, preferably polyetherols based on propylene 1,2-oxide and ethylene oxide, and in particular polyoxytetramethylene glycols. The polyetherols have the advantage of greater hydrolysis resistance than polyesterols.

c) Chain extenders (c) which may be used are well known aliphatic, aromatic and/or cycloaliphatic compounds having a molar mass of from 50 to 499, preferably bifunctional compounds, such as diamines and/or alkanediols having from 2 to 10 carbon atoms in the alkylene radical, in particular 1,4-butanediol, 1,6-hexanediol, and/or di-, tri-, tetra-, penta-, hexa-, hepta-, octa-, nona- and/or decaalkylene glycols having from 3 to 8 carbon atoms, and preferably corresponding oligo- and/or polypropylene glycols, and mixtures of these chain extenders may also be used.

d) Suitable catalysts which in particular accelerate the reaction between the NCO groups of the diisocyanates (a) and the hydroxy groups of the structural components (b) and (c) are the conventional tertiary amines of the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and also in particular organic metal compounds, such as titanic esters, iron compounds, e.g. iron(III) acetylacetonate, tin compounds, e.g. tin diacetate, tin dioctoate, tin dilaurate, or the dialkyltin salts of aliphatic carboxylic acids, such as dibutyltin diacetate, dibutyltin dilaurate, or the like. The amounts usually used of the catalysts are from 0.0001 to 0.1 parts by weight per 100 parts by weight of polyhydroxyl compound (b).

e) Besides catalyst (d), invention auxiliaries and/or additives (e) may also be added to the structural components (a) to (c). Examples which may be mentioned are surface-active substances, fillers, flame retardants, nucleating agents, antioxidants, lubricants, mould-release aids, dyes, and pigments, and, where appropriate and in addition to the inhibitors of the invention, other stabilizers, e.g. with respect to hydrolysis, light, heat or discoloration, inorganic and/or organic fillers, reinforcing agents, plasticizers, and hydrolysis stabilizers, in particular monomeric and polymeric aliphatic and aromatic carbodiimides.

Further details concerning the abovementioned auxiliaries and additives can be found in the technical literature.

All of the molar masses mentioned in this text have the unit [g/mol].

To adjust the hardness of those TPUs, the molar ratios of the structural components (b) and (c) may be varied relatively widely. The molar ratios between component (b) and the entirety of the chain extenders (c) to be used which have proved successful are from 10:1 to 1:10, in particular from 1:1 to 1:4, the hardness of the TPUs rising as the content of (c) increases.

It is preferable for chain extenders (c) to be included in the preparation of the TPUs.

The indices used for the reaction can be the usual indices, preferably from 60 to 120, particularly preferably from 80 to 110. The index is defined as the ratio between all of the isocyanate groups used during the reaction in component (a) and the groups reactive towards isocyanates, i.e. the active hydrogen atoms, in components (b) and (c). If the index is 100, components (b) and (c) have one active hydrogen atom, i.e. one function reactive towards isocyanates, for each isocyanate group in component (a). If the index is above 100, there are more isocyanate groups than OH groups.

The TPUs may be prepared by known processes either continuously, for example using reactive extruders or using the belt process, by the one-shot or the prepolymer method, or batchwise by the known prepolymer process. In these processes the components (a), (b), and, where appropriate (c), (d) and/or (e) entering into the reaction may be mixed with one another in succession or simultaneously, and the reaction then begins immediately.

In the extruder process, the structural components (a), (b) and also, where appropriate (c), (d) and/or (e) are introduced into the extruder individually or as a mixture, and reacted, e.g. at from 100 to 280° C., preferably from 140 to 250° C., and the resultant TPU is extruded, cooled and pelletized.

Conventional processes, e.g. injection molding or extrusion, are used to process the TPUs prepared according to the invention to give the desired films, moldings, rollers, fibers, coverings within automobiles, tubing, cable plugs, folding bellows, drag cables, cable sheathing, gaskets, drive belts, or attenuating elements, usually from pellets or powders.

The thermoplastic polyurethanes which can be prepared by the process of the invention, preferably the films, moldings, shoe soles, rollers, fibers, coverings within automobiles, wiper blades, tubing, cable plugs, folding bellows, drag cables, cable sheathing, gaskets, drive belts or attenuating elements, have the advantages described at the outset.

The examples below are intended to illustrate the advantages of the invention.

EXAMPLES

Example 1

(Synthesis of 3-(3,5-di-tert-butyl-4-hydroxyphenyl)propionate-terminated polytetrahydrofuran)

50 g of PTHF 250 ($M_w$=237.4 g/mol, 0.21 mol) were dissolved in 111.35 g of methyl 3-(3,5-di-tert-butyl-4-hydroxyphenyl)propionate (292,4 g/mol; 0.38 mol), together with 100 ppm of dibutyltin laurate, in a 250 ml flask, and the mixture was flushed with nitrogen for 20 min and heated to 180° C. The resultant methanol was removed by freezing in a cold trap (liquid nitrogen).

After 12 h the heat source was removed and the material was cooled under nitrogen, giving a highly viscous colorless liquid. GPC analysis confirms complete conversion of the methyl 3-(3,5-di-tert-butyl-4-hydroxyphenyl)propionate.

Example 2

900 g of PTHF 1000 were melted at 45° C. in a 2 l round-bottomed flask. 16.25 g of the product from Example 1 and 125 g of butanediol were then added, with stirring. The solution was heated, with stirring, to 80° C. in a 2 l bucket made from tinplate, and then 600 g of 4,4'-MDI were added and stirred until the solution was homogeneous. The TPU was then poured into a shallow dish in which the product was annealed in a heating cabinet at 100° C. for 24 h.

Example 3

500 g of polyethylene glycol ($M_w$=201.8 g/mol, 2.5 mol) were placed in a 300 ml flask with 1310 g of methyl 3-(3,5-di-tert-butyl-4-hydroxphenyl)propionate (292.4 g/mol; 5 mol), and also 500 ppm of dibutyltin laurate. The mixture was heated to 170° C. Nitrogen was carefully passed through the solution. The resultant methanol was condensed out in a Liebig condenser. After 18 h the reaction was terminated. GPC analysis confirms complete conversion of the starting components.

Example 4

A mixture made from 472 g of PTHF 250 ($M_w$=237 g/mol) and 402 g of polyethylene glycol ($M_w$=201 g/mol) was heated to 180° C. in a 2000 ml flask with 1018 g of methyl 3-(3,5-di-tert-butyl-4-hydroxyphenyl)propionate ($M_w$=292 g/mol, 4 mol), in the presence of 500 ppm of dibutyltin laurate. Nitrogen was carefully passed through the mixture during the reaction. The resultant methanol was condensed using a Leibig condenser. The reaction was terminated after 18 h. GPC analysis showed complete conversion of the starting components.

Example 5

Using a method similar to that of Example 2, three thermoplastic polyurethanes (TPUS) were prepared. Specimen 7a was stabilized with 2% by weight of product from Example 1. Specimen 7b was stabilized with 2% by weight of Irganox® 1010 (Ciba) and specimen 7c with 2% by weight of Irganox® 1330 (Ciba). After casting and annealing, the TPU was ground and injection molded under conventional conditions to give sheets of dimension 80×120×2 mm. Some of the injection-molded sheets were stored in a heating cabinet at 80° C., and the remainder was stored at room temperature. After 7 weeks the specimens were studied for a formation of deposits. Only specimen 7a was free from deposits under all of the conditions used.

| Specimen | Room temperature | 80° C. |
|---|---|---|
| 7a | no deposit | no deposit |
| 7b | deposit | no deposit |
| 7c | no deposit | deposit |

Example 6

To study the effectiveness of the stabilizers of the invention in stabilizing polyetherols, unstabilized Lupranol® 2080 (BASF Aktiengesellschaft) and Lupranol® 3300 (BASF Aktiengesellschaft) was stabilized with 1000 and, respectively, 500 ppm of stabilizer from Example 1. For comparison, the two polyetherols were stabilized with Irganox® 1135. The specimens were then studied for stability using DSC.

| Polyol | Stabilizer | Amount used | DSC-result |
|---|---|---|---|
| L 2080 | Example 1 | 1000 ppm | 171° C. |
| L 2080 | Irganox ® 1135 | 1000 ppm | 171° C. |
| L 3300 | Irganox ® 1135 | 500 ppm | 169° C. |
| L 3300 | Example 1 | 500 ppm | 169° C. |

It can be seen that the stabilization provided by the stabilizers of the invention is at least as good as that provided by the commercial product Irganox® 1135. The latter, however, has a low molar mass, 400 g/mol, resulting in fogging when the stabilizer is used. In contrast, the stabilizer from Example 1 has a molar mass of 800 g/mol, and the problems of fogging are therefore reduced.

Example 7

155 g of a trifunctional polyetherol (Lupranol® VP 9266, BASF Aktiengesellschaft) and 200 g of methyl 3-(3,5-di-tert-butyl-4-hydroxyphenyl)propionate were placed in a 500 ml flask. The mixture was heated to 100° C. with nitrogen flushing. 35 mg of titanium tetrabutoxide were then added. The mixture was heated to 165° C. with stirring and continued nitrogen flushing, and a slight vacuum was applied. After 2 h at 165° C., the mixture was heated to 170° C., and after a further 2 h to 175° C. After a further 4 h the reaction was terminated.

Example 8

To study the effectiveness of the stabilizer of the invention for stabilizing polyetherols, unstabilized Lupranol® 2080 (BASF Aktiengesellschaft) was stabilized with 1 000 ppm and, respectively, 500 ppm of stabilizer from example 7. The stability of the specimens was then investigated by means of DSC.

| Concentration of antioxidant | Start of polyetherol decomposition (DSC measurement) |
|---|---|
| None | 160° C. |
| 500 ppm | 165° C. |
| 1 000 ppm | 168° C. |
| 2 000 ppm | 174° C. |

It was apparent that the stability of the polyetherol increased as stabilizer concentration increased.

Example 9

110 g of polytetrahydrofuran (PTHF 250) (molar mass: 226.85 g/mol; 0.4849 mol) were placed in a 500 ml flask with 277.9 g of methyl 3-(3,5-di-tert-butyl-4-hydroxyphenyl)propionate (molar mass: 292.4 g/mol; 0.9504 mol), and also 1 000 ppm of potassium methoxide. The flask was flushed with nitrogen and the mixture was then heated to 140° C., with stirring. Passage of nitrogen through the solution was continued during the reaction. The resultant methanol was removed by freezing in a cold trap (liquid nitrogen). After 7 h the reaction was terminated. GPC analysis showed complete conversion of the methyl 3-(3,5-di-tert-butyl-4-hydroxyphenyl)propionate.

To remove the potassium methoxide, phosphoric acid (85% of the stoichiometric amount of potassium methoxide) was added at 80° C. After 30 min of stirring, 3% by weight of water were added at 80° C. with a mixing time of 2 h. The excess water was then removed by distillation and the precipitated salt was removed by filtration.

Example 10

In these stabilization tests, use was made of three thermoplastic polyurethanes (TPUs) prepared by a method based on example 2 and stabilized in different ways.

A=unstabilized, B=1% of Irganox® 1135, C=1% of stabilizer from example 12.

The TPUs prepared were processed to give 2 mm injection-molded plaques. From these, S2 standard specimens were stamped out and were then aged at 130° C. in an oven. After aging (1, 2, 4, 6 weeks), elongation at break (%) and tensile strength (MPa) to DIN 53 504 were determined.

Tensile strength values (in MPa)

| Product | 0 specimen | 1 week 130° C. | 2 weeks 130° C. | 4 weeks 130° C. | 6 weeks 130° C. |
|---|---|---|---|---|---|
| A | 43 | 14 | 12 | 13 | 13 |
| B | 41 | 23 | 14 | 14 | 13 |
| C | 39 | 29 | 21 | 16 | 16 |

Values for elongation at break (in %)

| Product | 0 specimen | 1 week 130° C. | 2 weeks 130° C. | 4 weeks 130° C. | 6 weeks 130° C. |
|---|---|---|---|---|---|
| A | 460 | 600 | 410 | 310 | 230 |
| B | 470 | 680 | 670 | 440 | 290 |
| C | 460 | 700 | 760 | 760 | 600 |

The test values show that the aging of the specimens protected by the stabilizer of the invention is less severe than that of the comparative specimens.

Example 11

30 g of (2-hydroxyethyl) (3-hydroxypropyl) sulfide (molar mass: 136.21 g/mol; 0.2202 mol) were placed in a 250 ml flask with 128.8 g of methyl 3-(3,5-di-tert-butyl-4-hydroxyphenyl)-propionate (molar mass: 292.4 g/mol; 0.4404 mol), and also 2 000 ppm of potassium methoxide. The flask was flushed with nitrogen and then heated to 140° C., with stirring. Passage of nitrogen through the solution continued during the reaction. The resultant methanol was removed by freezing in a cold trap (liquid nitrogen). After 12 h the reaction was terminated. GPC analysis showed complete conversion of the methyl 3-(3,5-di-tert-butyl-4-hydroxyphenyl)propionate.

The potassium catalyst was removed by adding phosphoric acid (85% of the stoichiometric amount of potassium methoxide) at 80° C. After 30 min of stirring, 3% by weight of deionized water were added and stirring was continued for 2 h. The excess water was then removed by distillation, and the precipated salt was removed by filtration.

Example 12

(Synthesis of 3-(3,5-di-tert-butyl-4-hydroxyphenyl)propionate)-terminated polytetrahydrofuran)

50 g of PTHF 250 (molar mass: 237.4 g/mol, 0.21 mol) were placed in a 250 ml flask with 111.35 g of methyl 3-(3,5-di-tert-butyl-4-hydroxyphenyl)propionate (molar mass: 292.4 g/mol, 0.38 mol), and also 50 ppm of dimethyltin dilaurate, and dissolved, and then the mixture was flushed with nitrogen for 20 min and heated to 180° C. The resultant methanol was removed by freezing in a cold trap (liquid nitrogen).

After 12 h, the heat source was removed and the material was cooled under nitrogen. This gave a high-viscosity colorless liquid. GPC analysis confirmed complete conversion of the methyl 3-(3,5-di-tert-butyl-4-hydroxyphenyl) propionate.

Example 13

122.6 g of methyl 3-(3,5-di-tert-butyl-4-hydroxyphenyl) propionate, 420 mmol, 48.3 g of polyetheramine D 230 (BASF Aktiengesellschaft), 2 g of p-toluenesulfonic acid (10 mmol), and 0.5 g of 50% strength hypophosphorous acid were placed in a 500 ml flask and heated to 180° C. The resultant methanol was removed by way of a distillation bridge. Conversion was determined via the amine value. After 4 h conversion was 91%. The product was pale yellow, glassy, and clear.

We claim:

1. A stabilizer containing at least two phenolic groups bonded to one another via a connecting residue (II) comprising a polyol and/or amine with a number-average molecular weight of from 100×F g/mol to 150×F g/mol, where the term F is the number of phenolic groups in the molecule; and wherein the number-average molecular weight (Mn) of the residue (II) is smaller than its weight-average molecular weight (Mw).

2. A stabilizer as claimed in claim 1, wherein the residue (II) contains at least one sulfur atom.

3. A stabilizer as claimed in claim 1, wherein the residue (II) contains at least two alkylene groups which differ in their number of carbon atoms.

4. A stabilizer as claimed in claim 1, which has a viscosity η of from $10^{-2}$–$10^2$ Pas at room temperature (25° C.).

5. A thermoplastic comprising stabilizers as in claim 1, 2, 3, or 4.

6. A thermoplastic polyurethane comprising stabilizers as in claim 1, 2, 3, or 4.

7. A process for preparing thermoplastic polyurethanes comprising reacting (a) isocyanates with (b) compounds reactive towards isocyanates and having a molecular weight of from 500 to 10000 and, optionally, with (c) chain extenders having a molecular weight of from 50 to 499, optionally in the presence of (d) catalysts, and/or additives, the reaction is carried out in the presence of stabilizers as in claim 1, 2, 3, or 4.

8. A process for stabilizing thermoplastic polyurethanes, comprising mixing molten thermoplastic polyurethane with a stabilizer as in claim 1, 2, 3, or 4.

9. A process for preparing stabilizers as in claim 1, 2, 3, or 4, comprising esterifying, amidating, transesterifying, or transamidating compounds containing at least one phenolic group, and also at least one carboxy group, using a polyol and/or amine in the presence of basic catalysts.

10. A stabilizer as claimed in claim 1, wherein the residue (II) is a polytetrahydrofuran having a number average molecular mass of from 200 to 280 grams per mole.

11. A stabilizer as claimed in claim 1, wherein the residue (II) has the following formula: H—[OCH$_2$CH$_2$]$_n$—O—R—O—[CH$_2$CH$_2$O]$_m$—H; wherein each of n and m are an integer, where n and m can be different, where the total of n and m gives the molecular weight of the residue II according to the claim, and R is a linear or branched chained C$_5$ to C$_{12}$ alkyl group.

12. A stabilizer as claimed in claim 1, wherein the residue (II) is a trifunctional polyetherol.

* * * * *